Figure 1:
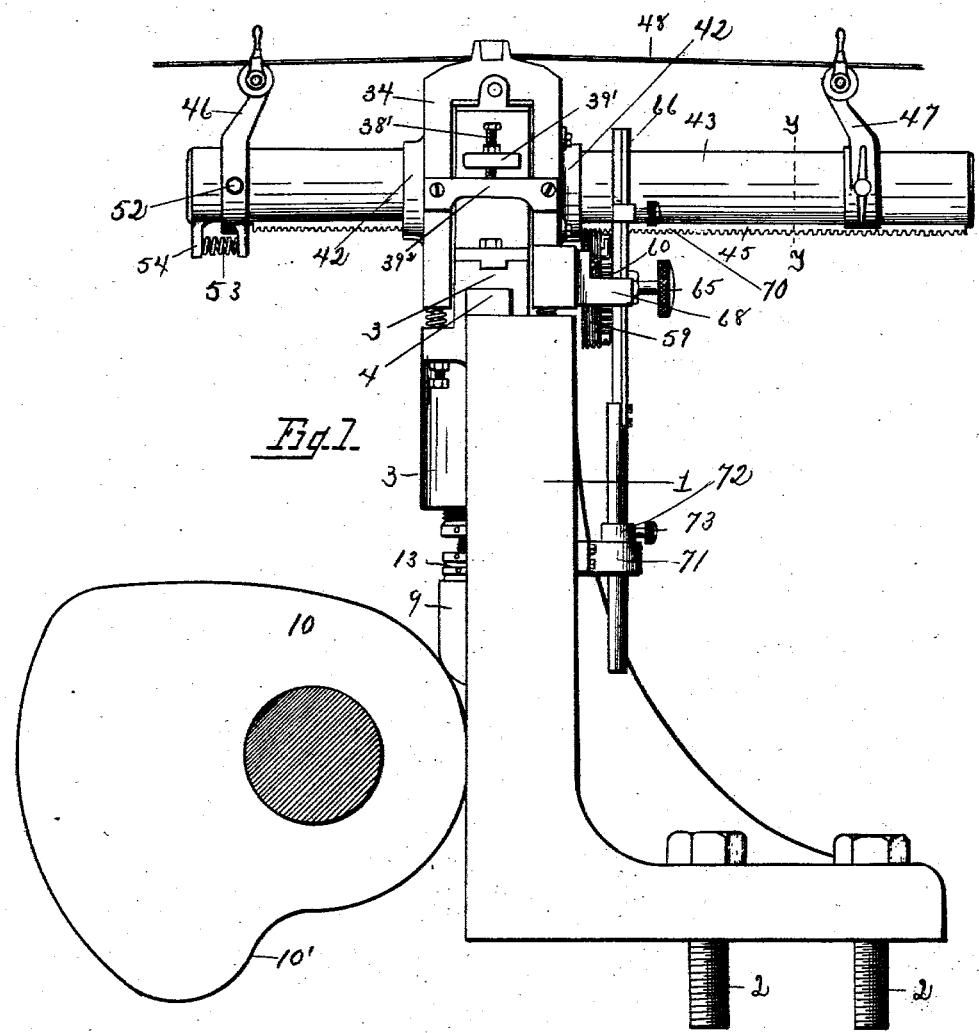

No. 634,715. Patented Oct. 10, 1899.
E. V. BEALS & W. B. NORTON.
MATRIX MAKING MACHINE.
(Application filed Nov. 1, 1893.)
(No Model.) 9 Sheets—Sheet 1.

WITNESSES
Carroll J. Webster
Bertha M. Schweiger

INVENTORS
Erle V. Beals
William B. Norton
By William Webster
Attorney.

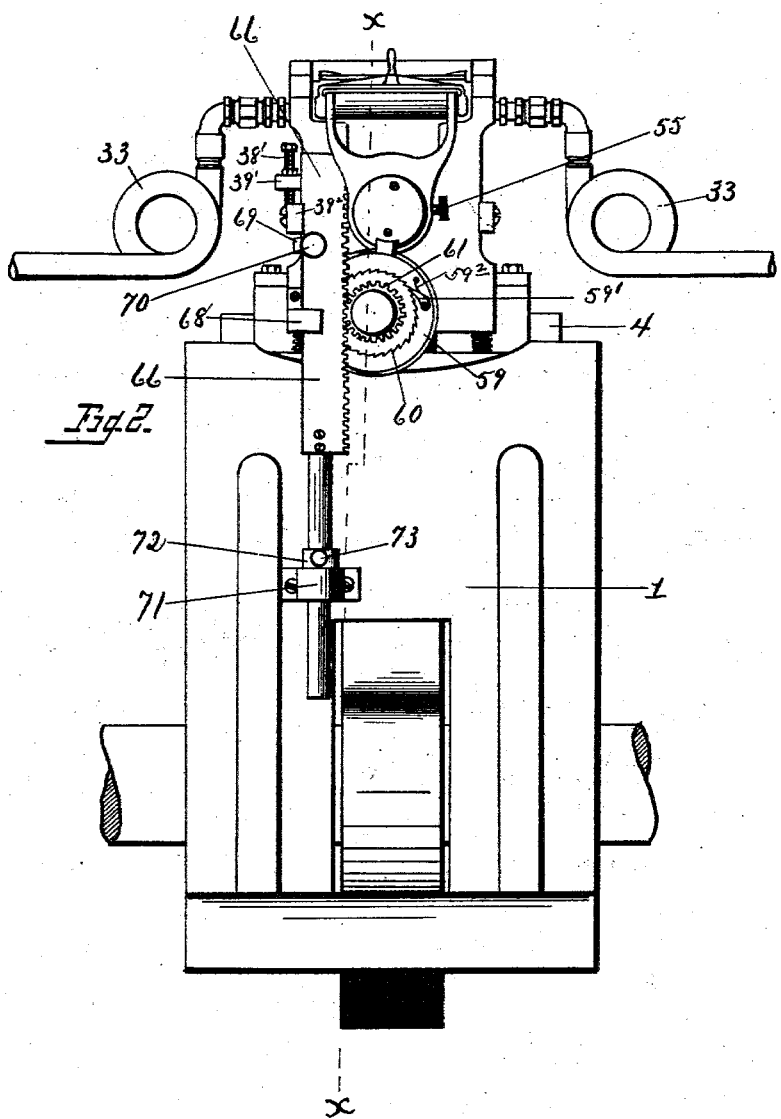

No. 634,715. Patented Oct. 10, 1899.
E. V. BEALS & W. B. NORTON.
MATRIX MAKING MACHINE.
(Application filed Nov. 1, 1893.)
(No Model.) 9 Sheets—Sheet 3.
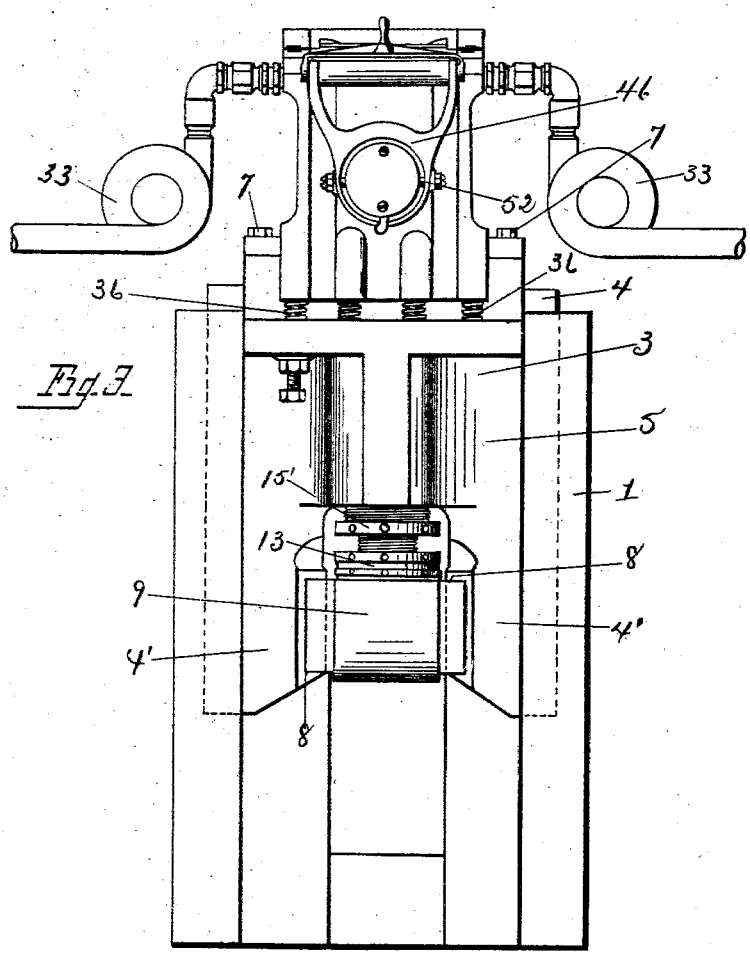
WITNESSES
Carroll J. Webster.
Bertha M. Schweizer.
INVENTORS
Erle V. Beals
William B. Norton
By William Webster
Attorney.

No. 634,715. Patented Oct. 10, 1899.
E. V. BEALS & W. B. NORTON.
MATRIX MAKING MACHINE.
(Application filed Nov. 1, 1893.)
(No Model.) 9 Sheets—Sheet 4.
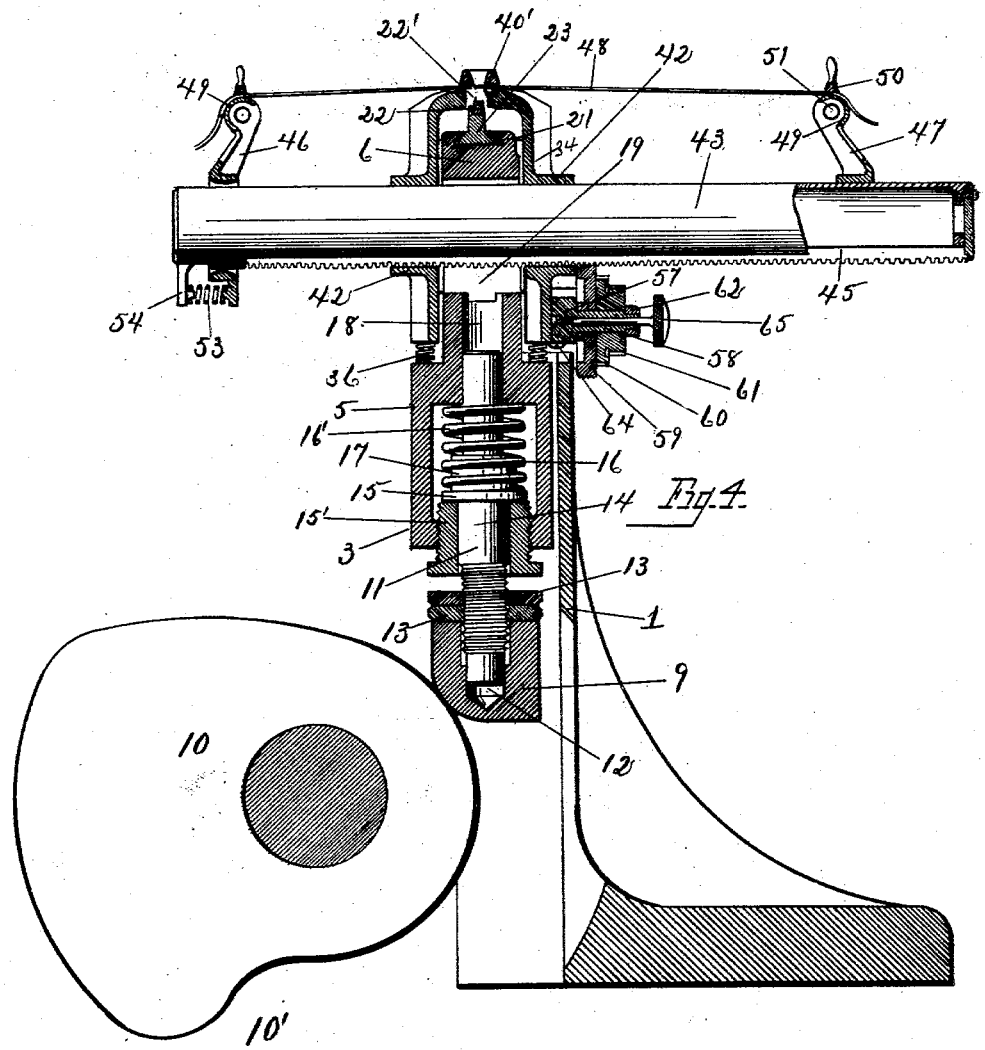
WITNESSES
INVENTORS
Erle V. Beals
William B. Norton
By William Webster
Attorney.

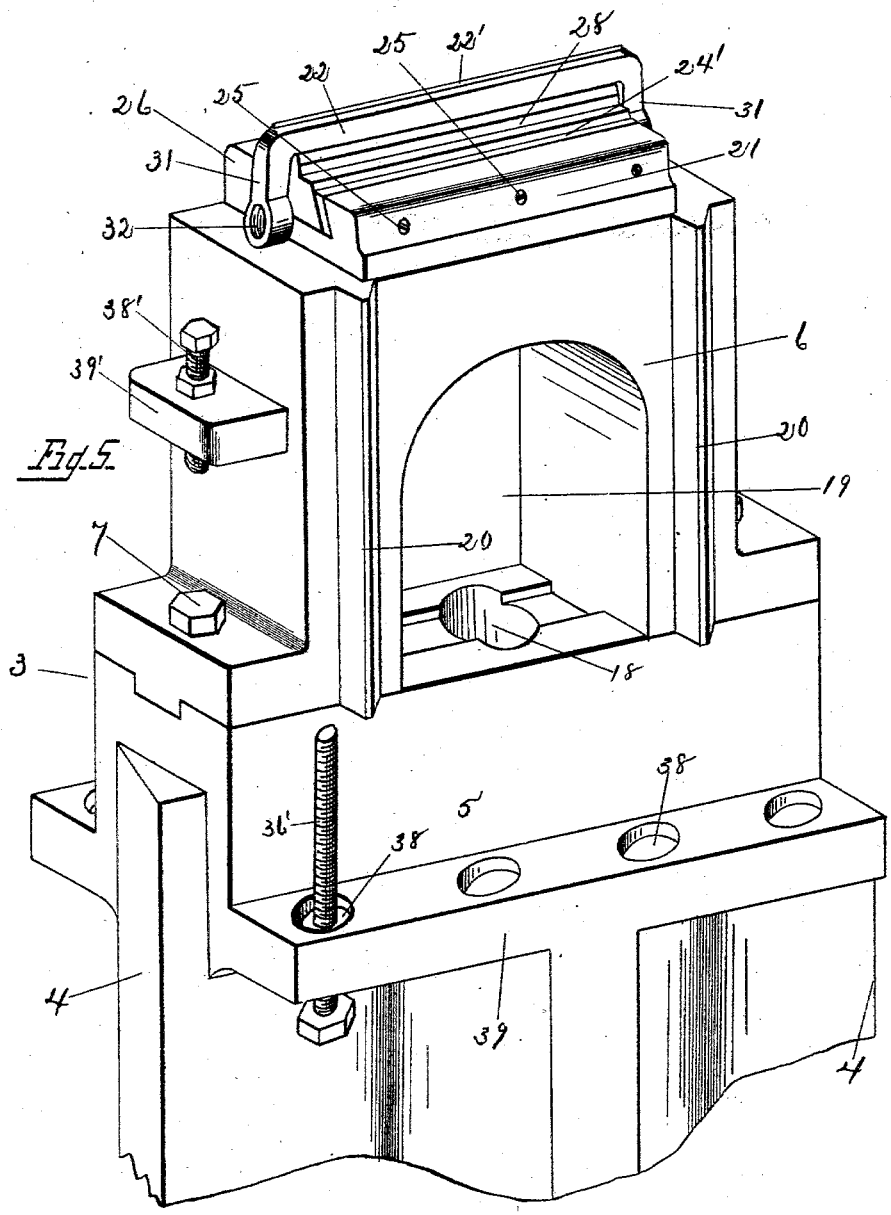

No. 634,715. Patented Oct. 10, 1899.
E. V. BEALS & W. B. NORTON.
MATRIX MAKING MACHINE.
(Application filed Nov. 1, 1893.)
(No Model.) 9 Sheets—Sheet 6.
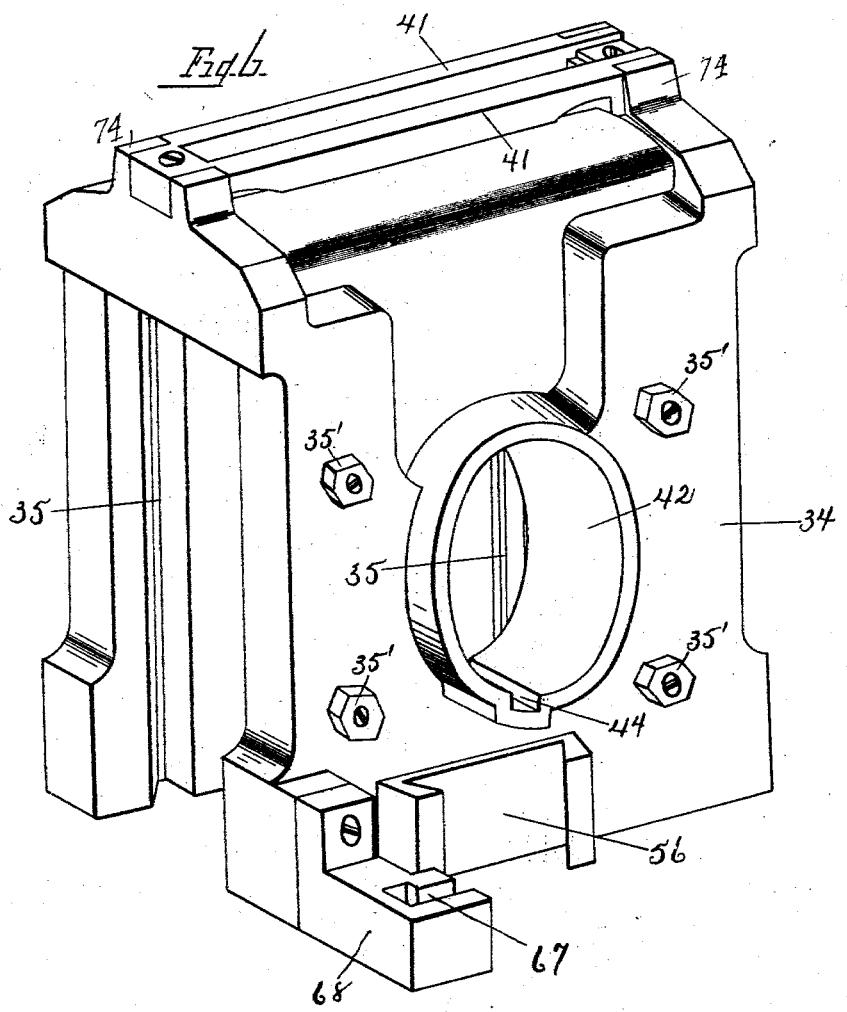

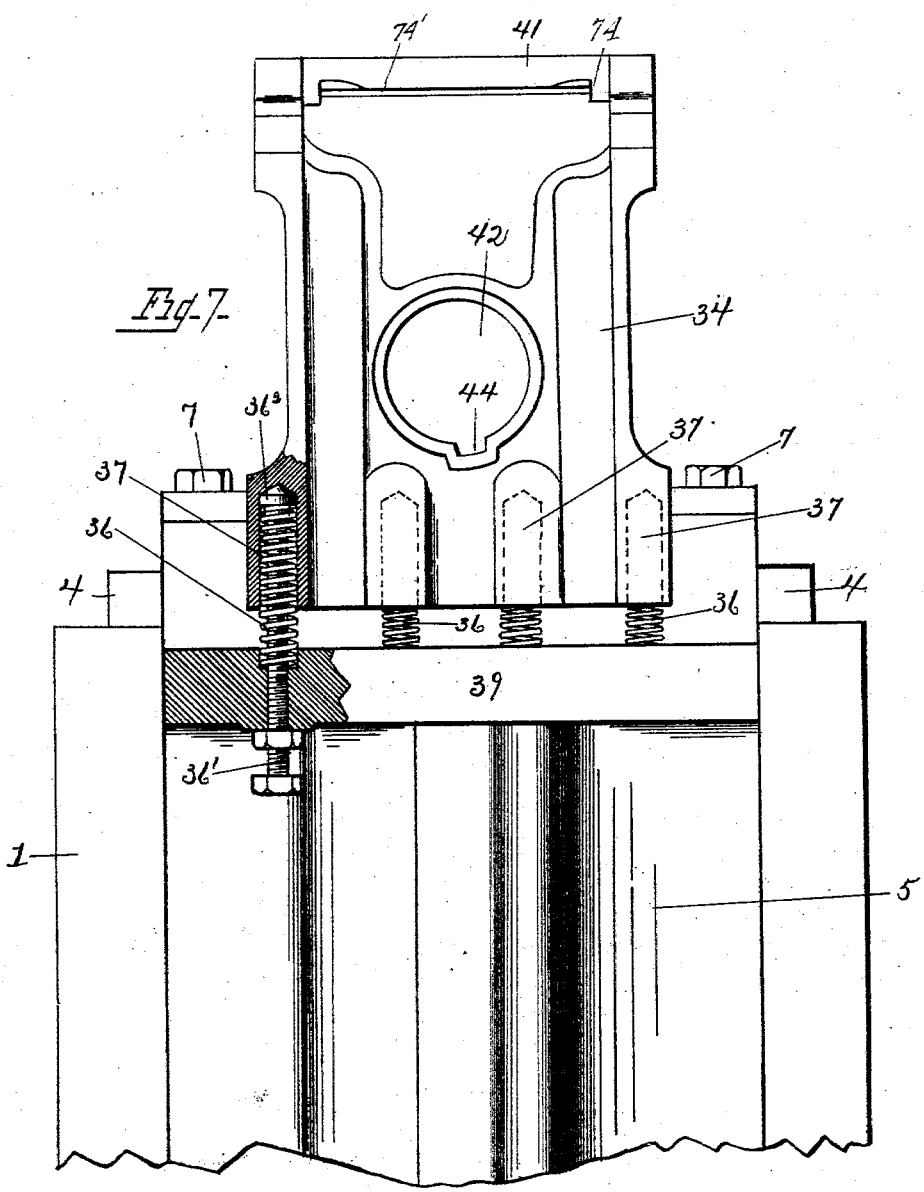

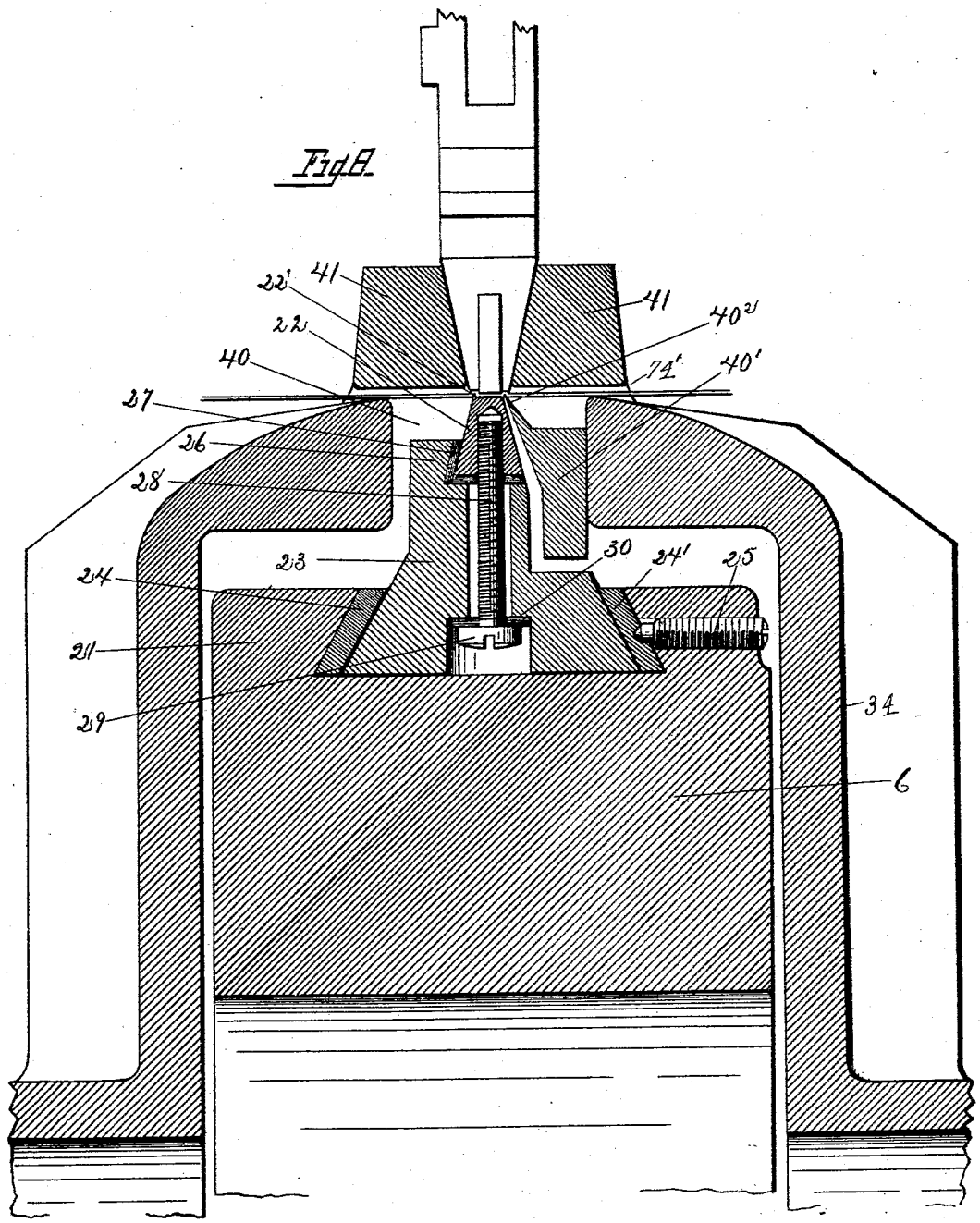

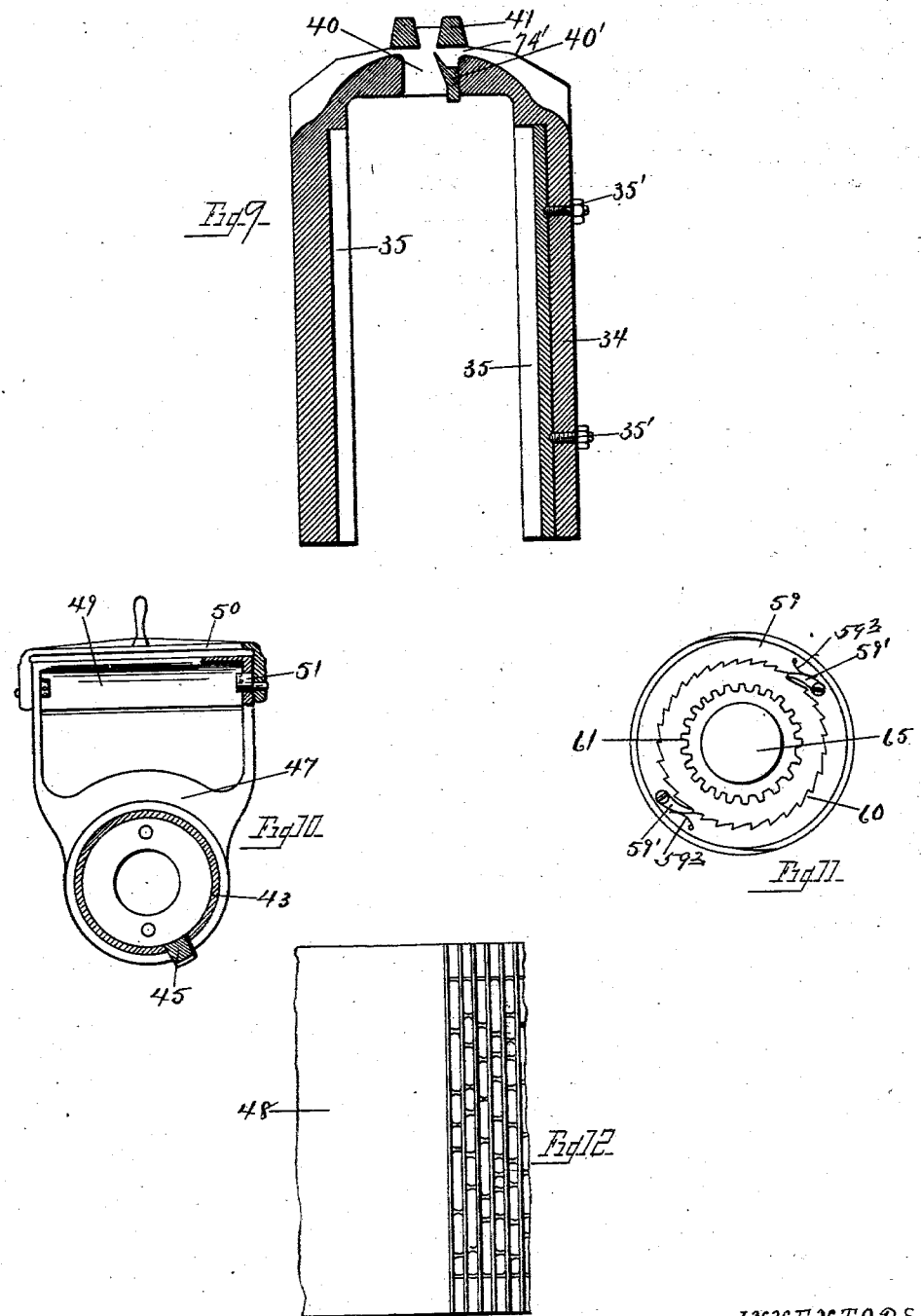

UNITED STATES PATENT OFFICE.

ERLE V. BEALS AND WILLIAM B. NORTON, OF DETROIT, MICHIGAN.

MATRIX-MAKING MACHINE.

SPECIFICATION forming part of Letters Patent No. 634,715, dated October 10, 1899.

Application filed November 1, 1893. Serial No. 489,685. (No model.)

*To all whom it may concern:*

Be it known that we, ERLE V. BEALS and WILLIAM B. NORTON, of Detroit, county of Wayne, and State of Michigan, have invented certain new and useful Improvements in Matrix-Making Machines; and we do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to matrix-making machines, and has for its object improvements in that part of the machine in which the impression matrix or mold is prepared from a line of type that has been assembled and justified for the purpose of producing such a matrix.

In order to produce a stereotype-plate suitable for printing purposes, there must first be prepared, assembled, and justified many lines of type, each of which reaches across the column of printed matter and each of which is separated from the line adjoining it by the usual space. In newspaper work the lead used to make the space is frequently so thin (when type are set solid) that letters extending below the line will almost meet the upstrokes of letters extending above the line, and in producing a matrix from which a stereotype-plate is to be cast provision must be made that the impressions in the matrix or mold at places corresponding to the upstrokes and downstrokes of the letters shall be as clear and distinct as any other part of the matrix. In the machine which embodies this invention the matrix is made one line at a time. The dies used in forming the matrix are assembled, justified, and brought one line at a time to the impression part of the machine and there forced into a suitable matrix composition and are then removed, leaving the impression of that line of type in the composition as a matrix from which the stereotype-plate is cast. The composition is then advanced one line-space and another line of dies is forced into the fresh surface of matrix composition thus presented at the impression part of the machine. The matrix composition is soft, and the second impression is apt to crowd and distort the first impression unless provision be made to prevent such a result, and it is the object of this invention to produce a machine by which the impressions made by the dies shall be formed a line at a time in the matrix composition successively and close enough together to be used for the production of a stereotype-plate suitable for printing ordinary newspaper work without crowding or distorting any of the impressions that have been previously made in the matrix composition. To accomplish the desired result, we employ a strip of matrix composition that has a width equal to the length of the line of printed matter that it is desired to produce. This matrix composition is preferably made of what is known as "stereotype-paper," and it is used in a damp and soft condition. The matrix composition is supported on a carriage and fed forward with each succeeding line of impressions, and as the impression is made and while the die-type are in contact with the matrix composition that part of the composition which is in immediate contact with the die-type is heated and dried, and the portion under the heating and drying treatment is also separated both from the parts that have been previously treated and from parts that are to be subsequently treated, and on the one hand guard the previously-made line of the matrix from distortion and on the other hand guard that part of the matrix composition which will next come under treatment from the heating and drying effect that is being produced in the line in contact with the die-type. In order to produce the high heat necessary and confine this high heat within the desired limits, we employ for the heating-platen a rod or bar having a high electrical resistance and heat it by passing an electric current through it. On the side of the pressure-bar which lies next to the unused portion of the matrix material is a creasing edge which projects beyond the surface of the drying-bar and produces a thin crease in the material and guards all the material lying beyond the crease from the effects of the heat. When the material is advanced for the next impression, the crease formed by this edge engages with the thin edge of a guard that rises from the alining-plunger, and this guard prevents the composition under pressure from crowding into and distorting the matrix previously made.

For convenience of description this machine may be divided into three parts: first, the type-aliner or type-alining plunger; second, the carriage by which the matrix composition is advanced; third, the plunger, by which the compressing and drying bar is pushed against the type and the creasing edge pushed into the material. The type-alining plunger is sleeved on the compressing-plunger and is arranged to move into engagement with the type in advance of the engaging contact of the drying bar with the matrix material, and it remains in engagement with the type after the drying-bar has been removed from contact with the matrix composition. The carriage is held by this alining-plunger and moves vertically with it. It also travels across the vertical axis of the alining-plunger, and the traveling motion of the carriage is produced by the interaction of a toothed wheel, carried by the alining-plunger and a rack that is prevented from moving during the return or downward movement of the plunger by a lug on the main supporting-bracket. The special means for producing the motion will be described.

In the drawings, Figure 1 is a side elevation of the complete machine. Fig. 2 is a front elevation showing that end of the machine which is at the right of Fig. 1. Fig. 3 is a rear elevation. Fig. 4 is a sectional view on the line X X of Fig. 2. The carriage is shown partly in elevation. Fig. 5 is a perspective view showing part of the plunger that carries the drying-platen. Fig. 6 is a perspective view showing the alining-plunger. It also shows the connection between this plunger and the alining-bars, between which the front ends of the type are received. Fig. 7 is an end elevation, a small part being shown in section, and it shows particularly the connection between the two plungers and indicates the way in which the alining-plunger is supported on the drying-plunger. Fig. 8 is an enlarged sectional view showing the drying-platen and means for securing it to the body of the plunger and insulating it. Fig. 9 is a sectional view of the alining-plunger as it appears separated from the drying-plunger. Fig. 10 is an enlarged section at Y Y of Fig. 1. It shows the clamp by which the matrix composition is held to the carriage. Fig. 11 shows the pinion, ratchet, and the screw by which an intermittent forward motion is given to the carriage. Fig. 12 shows a partially-finished column of matrices.

1 indicates a bracket which supports the working parts of the entire machine and is itself secured to any suitable foundation by bolts 2. The supporting-bracket 1 has two or more vertical pillars, each of which is provided with a slideway or groove, in which engages or travels a runner 4, that projects from the body of the plunger 3. The plunger 3 is divided into three main parts. Of these we will call the upper part 6 the "head," the middle part 5 the "body," and the lower part 9 the "shoe." The shoe 9 hangs between two lobes 4'. These lobes hang from the body part of the plunger. Each lobe 4' has a vertical groove in it, and the shoe has two runners 8, one on each side, which travel in the grooves of the lobes.

Below the shoe 9, mounted on a properly-placed shaft, is a cam-wheel 10, that engages with the shoe and reciprocates it. The reciprocation of the shoe is communicated to the body 5 of the plunger by a push-bar 11. (See Fig. 4.) The lower end of the push-bar 11 rests loosely in a cavity 12 in the shoe. The extreme lower end of the push-bar is round and smooth and is provided with any suitable means for holding it to the shoe, such as a set-screw. Above the round and smooth part the push-bar is still round, but its diameter is increased and it is screw-threaded for a distance, and on the screw-threads are adjusting-nuts 13, which regulate the distance that the lower end of the push-bar projects into the shoe, and consequently enables us to vary the length of the push-bar at this end by changing the position of the adjusting-nuts and the distance the end of the push-bar projects into the shoe. Above the threaded part of the push-bar it is enlarged and again made smooth, and this part traverses a nipple 15', which is screwed into the lower end of the body 5.

The body part 5 of the plunger 3 has a hole extending vertically through it, in the lower end of which is screwed the nipple 15', just spoken of, and the upper end of which receives and acts as a guide for the upper end of the push-bar. Between the upper and lower ends the hole is enlarged to furnish a place for a spring. Above the smooth round part 14 of the push-bar is a collar 15, that rests above the upper end of the nipple 15', and above the collar 15, surrounding the push-bar, is a coiled spring 16'. The collar 15 and the coiled spring 16' are in the enlarged part 16 of the hole through the body part 5 of the plunger. The lower end of the coiled spring bears against the collar and the upper end bears against the shoulder surrounding the guide-hole 18. The tension of the spring is adjusted by turning the nipple 15' in its seat. On the amount of motion given to the push-bar and the tension of the spring 16' depends the ultimate pressure, which is utilized in compressing the matrix material against the type. The amount of motion given by the cam-wheel to the shoe 9 is of course constant, the amount of motion transmitted to the push-bar is regulated by the adjusting-nuts 13, and the amount of motion given to the pressure and drying platen is determined by the amount of motion of the push-bar and the tension of the spring.

Above the body part 5 of the plunger is the head part 6, made in a separate piece and bolted to the body part by bolts 7. (See Fig. 5.) Through the head part 6 is a transverse opening 19, which permits the free vertical movement of the entire heater-plunger without producing a corresponding movement on the carriage which supports the matrix composition. The carriage which supports the matrix composition does have a vertical movement in connection with the alining-plunger with which it is connected, and this vertical movement is indirectly produced by the movement of the heater-plunger; but it is not uniform with the movement of the heater-plunger, as will appear when its own motion is explained.

On each side of the headpiece 6 are runners 20, that engage with grooves 35 in the sleeve 34, which forms the alining-plunger. At the summit of the head is a mortise extending from front to back and lying between the side walls or lips 21. In the mortise is secured a platen-support 23, held in place by gibs 24 24' and holding-screws 25. (See Fig. 8.) Through the platen-support 23 are several vertical holes, each of which is enlarged on the under side or countersunk on the under side to receive the heads of screws 28, which secure the platen to the support. (See Fig. 8.) On the upper side of the platen-support is a ledge 26 and a side wall similar in form to the half of the mortise between the lips 21. The ledge 26 forms a seat for the heating-platen 22. Between the heating-platen and the ledge and between the heating-platen and the side wall is a suitable insulating material 27; also, between the heads 29 of the screws 28 and the platen-support 23 is inserted suitable insulating material 30, which prevents the head 29 of the screw from making electrical contact with the platen-support. The body of the screw is free from contact with the platen-support, as the screw-hole is of larger diameter than the screw, as shown, and the heating-platen is thus entirely insulated electrically from all parts of the machine.

At each end of the heating-platen is an arm 31, preferably made as a hanger, and each arm 31 has at its lower end a screw-threaded hole 32, in which suitable coupling-screws are driven to couple the electric conducting-wires 33 to the heating-platen. (See Fig. 5.)

The heating-platen is made of metal of a high resistance, so that under proper regulation of current it becomes highly heated and heats and dries rapidly the matrix composition in contact with its upper side.

On the upper side of the heating-platen and on that edge which looks toward that portion of the matrix composition that has not yet been treated by the platen is a creaser 22'. This is a thin projection like a knife-edge, extending above the face of the heating-platen, whose object is to produce a crease of the width of a narrow lead in the matrix material. It also has a secondary object to crowd the matrix material against the shoulder of the type, accomplished by reason of the shape and position of the creaser 22', as is plainly shown in Fig. 8.

Sleeved on the upper end of the heating-plunger is the alining-plunger 34. This plunger covers the sides and upper end of the heating-plunger, and an opening is made in this alining-plunger from front to rear across the top, into which the heating-platen rises from below, and the type-bars are received from above. The type-bars are received between two parallel alining-blocks 41, and these alining-blocks are carried by the alining-plunger on which they are supported by struts 74. (Seen in Fig. 6.) Underneath the alining-blocks and between the struts and above the upper end of the heater-plunger is a passage-way 74' for the matrix composition. The sleeve of the alining-plunger is held from horizontal movement but permitted to travel vertically on the heating-plunger by runners 20, which slide in grooves 35 on the interior of the sleeve. Adjustment for wear is provided for by gibs which are held in place by adjusting-screws 35'. The alining-plunger is actuated by the motion of the heating-plunger, but its movement is not at all times and under all circumstances equal to the movement or similar to the movement of the heating-plunger, a difference of motion being necessary because in order to produce work of the desired accuracy it is found necessary to bring the alining-blocks into engagement with the type, from which the impression is to be taken an instant before the pressure-platen begins to compress the matrix composition onto the faces of the type and into the depressions within and between the type-faces. To do this, the alining-blocks after taking their engaging position come to a full stop, while the pressure-platen continues to advance to do its work. We are enabled to produce these results with what may be called a "single-stroke" mechanism by the means we employ of yieldingly supporting the alining-plunger on the pressure-plunger and giving it motion therefrom.

On the sides of the heating or pressure plunger are two flanges 39, on the upper side of which are a number of holes 38. In the walls of the sleeve that forms the main part of the alining-plunger 34 are a number of holes or sockets 37, which open downward and register with the holes 38, and in the holes 37 38 are placed springs 36. The sleeve 34 rests yieldingly on these springs. One of the holes 38 extends through the flange and is screw-threaded, and a screw 36', passing through this hole within the spring, projects into the socket $36^2$ above it and furnishes an adjustable stop which prevents the sleeve 34 from sliding toward the ledge 39 farther than it ought to, the distance being determined by the adjustment of the screw 36'. The throw of the sleeve in the opposite direction is adjusted by a screw 38', which passes through a lug 39' on the heating-plunger, and the screw abuts against a cross-bar $39^2$, (seen on Fig. 2,) that is secured to the plunger 34. The limit of movement in both directions of the sleeve is thus made adjustable by the use of these springs and adjusting-screws.

40 indicates the opening through the hood of the alining-plunger.

40' indicates a support which is secured in the opening 40 of the hood and carries at its inner edge a knife-edge which is adapted to engage in the crease previously made by the creaser 22', and thus protect the impressions previously made from being distorted by the pressure of the platen in forming a new line of impressions across the matrix composition. It has also as a secondary object to force the matrix composition back to the shoulder of the type from which the impression is taken, accomplished by reason of the shape and position. (See Fig. 8.)

Through the hood or sleeve 34 is a carriage-way 42, which may be of any suitable shape to carry a solid or tubular carriage in which are suitable supports for the matrix composition. We have shown this carriage as composed of a piece of round tubing 43, having on one side of it a spline or feather cut into the form of a rack. The spline or feather travels in the keyway 44 and serves to hold the carriage steady from rotary movement. The spline or feather is cut into a rack which engages with feeding mechanism that will be described hereinafter. On the forward end of the carriage is an arm 47, adjustable along the carriage, but otherwise immovable. This arm 47 is a forward support for the strip of matrix composition 48, and it is placed at any proper position on the carriage and held in place by a set-screw 55. On the opposite or rear end of the carriage is secured a holding-arm 46, which, however, is hung on pins 52 and can swing with a vibrating motion on the pins 52. The lower end of the vibrating arm 46 is provided with a heel-piece, and between the heel-piece and a lug 54, that hangs from the rear end of the carriage, is a spring 53, the object of which is to hold the upper end of the arm 46 back, but permit it to yield slightly forward under the strain produced by the action of the creasing-knife 22'.

Each one of the arms 46 47 supports at the upper end a cross-bar having a length equal to the width of the matrix composition. The upper surface of this cross-bar is curved, and above it there is a clamping-jaw 50, which swings on a wrist-pin that is itself eccentric to a rotary shaft or pin 51, by which the wrist-pin is carried. This enables us to adjust the clamping-jaws 49 50 for different thicknesses of material and enables us to produce a clamping action between the jaws by swinging the jaw 50 on the pin carried by the rotary shaft 51. (See Fig. 10.)

The feeding motion of the carriage is produced by the following-described mechanism: On the sleeve 34, below and at one side of the carriage, is a bracket 56, (see Fig. 6,) in which there is a vertical dovetailed groove, and in the groove is a dovetailed block 57, (see Fig. 4,) which has a slight vertical travel to enable the screw which it carries to be thrown in and out of engagement with the rack on the carriage. It is held from escaping from the bracket by overhanging screw-heads, one above and one below. The one below is seen in Fig. 4 at 64. The block 57 supports a short arbor 58, upon which is journaled a worm-screw 59 and a ratchet-wheel 60, the latter made integral with a pinion 61. Pawls 59' on pins on the worm-screw 59 are held in engagement with the ratchet-wheel 60 by springs $59^2$. (See Fig. 11.) The parts are all secured on the arbor by a nut 62 and are held from movement vertically by a jam-screw 65, that passes through the arbor, on which the movable parts turn, and through the block 57 and engages with the bracket 56 behind the block. These parts, which are employed to actuate the carriage, are moved to bring the worm-screw into or out of operative engagement with the rack on the carriage by loosening the jam-screw 65 and moving the block 57 up or down, as may be desired.

In operation the carriage is given a forward motion by turning the pinion 61 by means of the rack 66, which is guided by lugs 68 and 71, the latter of which is on the main supporting-bracket 1 and the other of which is on the alining-plunger. The lug 71 on the supporting-bracket is perforated, and the stem of the rack 66 passes through the perforation. There is also on the stem of the rack a movable collar 72, adjustable along the stem and held in place after adjustment by a set-screw 73. The upper end of the rack 66 is held in engagement with the pinion 61 by a guide 68, which is formed as a lug or bracket on the sleeve 34. (See Figs. 2 and 6.) Above the guide 68 is a stop 69, adjustable along the rack and held in its adjusted position by a set-screw 70. The proper adjustment of the two stops 69 and 72 enables us to produce a feed motion of the carriage regulated to any desired amount that will be required for the work to be done, and we are able to adjust the feed motion with extreme nicety. The forward motion of the carriage takes place with the downstroke of the plungers, and to adjust the forward motion to any desired length we first set the stop 69 at an index-line on the rack 66 and raise the plungers until the carriage is in its most elevated position, next drop the stop 72 into engagement with the lug 71 and set it, then lower the plungers, and the carriage advances as the plungers lower by reason of the rack being held by the lug 71 and the pinion 61 moved downwardly therealong. Continue to lower the plungers until the carriage has advanced exactly the desired distance, loosen the upper stop 69, and drop it into engagement with the guide 68, and set the screw 70. Next drop the worm-screw out of engagement with the rack 45 on the carriage, so that the carriage will not be fed by a downward movement of the plungers, and drop the plungers as far down as they will go, loosen the lower set-screw 73 and drop the rack until the stop 69 again engages with the lug 68, set the stop 72, and loosen the stop 69 and lift it to the index-line. Replace the worm-screw in gear with the rack on the carriage. On its next upward stroke the sleeve in rising rises through the distance between the stop 69 and the lug 68 without producing any upward movement of the rack 66. It then lifts the rack through the remainder of the stroke of the plunger. On the return or down movement of the sleeve the rack drops with the plunger until the stop 72 engages the lug 71, and through the remainder of the down movement of the plunger the rack 66, which is held by stop 72, actuates the pinion and gives it the desired forward movement.

What we claim is—

1. In a matrix-machine, the combination of a plunger adapted to engage with and aline the type, and an independent plunger adapted to press the composition against the type, the said first-mentioned plunger being sleeved on the second and yieldingly secured thereto, whereby the two plungers come into pressing engagement successively.

2. In a matrix-making machine, in combination with the type-alining mechanism, pressure mechanism and a creasing-knife, a carriage having a forward matrix-holding clamp and a rear swinging clamp.

3. In a carriage for a matrix-making machine, the combination of a clamp adjustably mounted on the carriage, and a yielding clamp on the carriage.

4. In combination with the carriage of a matrix-making machine, a movable alining-plunger and mechanism actuated by said plunger and adapted to give forward movement to the carriage.

5. In combination with the carriage of a matrix-making machine a worm-rack extending lengthwise of the carriage, a worm-screw meshing with said rack, a pinion, ratchet-wheel and pawl, adapted to actuate said worm-screw, a loose rack meshing with said pinion and mounted in guides, one of which is fixed and the other movable and stops on said rack whereby the forward movement of the carriage may be regulated.

6. In combination with a carriage of a matrix-making machine, a clamp comprising a jaw having a round bearing-surface, a revoluble shaft, pins eccentrically of said shaft, and a bar forming the second jaw pivoted on said pins.

7. In a matrix-making machine as a means for regulating the stroke of the pressure-platen, a pressure-platen, a push-bar adjustable in relation thereto, a spring interposed between the push-bar and the platen, and means for moving the push-bar.

8. In a matrix-making machine as a means for regulating the stroke of the pressure-platen, a platen, a push-bar, a spring interposed between the platen and push-bar, a shoe on said bar, an actuating means adapted to engage said shoe, and adjusting-nut on the push-bar adapted to regulate the position of said shoe on the push-bar.

9. As a means for regulating the stroke of the pressure-platen of a matrix-making machine, a push-bar, a platen-carrying plunger, a spring interposed between said push-bar and plunger, an actuator for said plunger, a shoe interposed between the push-bar and the said actuator, and adjusting-nuts regulating the place of engagement between the shoe and the actuator.

10. In a matrix-making machine, the combination of a pressure-plunger, an alining-plunger yieldingly sleeved on the pressure-plunger, spring connections between the pressure and alining plungers, and means for limiting the yielding motion of said alining-plunger.

11. In a matrix-making machine, the combination of the pressure-plunger, an alining-plunger yieldingly sleeved thereon, means for adjusting the stroke of the pressure-plunger, and means for adjusting the force of the pressure-plunger, substantially as described.

12. In a matrix-making machine, a plunger having alining-bars to engage and aline the type, an impression-plunger carrying a platen to engage and impress the composition, said alining-plunger having a vertical movement and sliding in ways upon the impression-plunger, springs interposed between the two plungers, a cam for actuating the plungers, a shoe against which the cam abuts and yielding connections between the impression-plunger and the shoe.

13. In a matrix-making machine, the combination of an impression-plunger, a type-alining device yieldingly supported by said impression-plunger, and means for operating said impression-plunger.

14. In a matrix-making machine, the combination of an impression-plunger, a carriage for the matrix material supported by said impression-plunger, and mechanism for feeding said carriage.

15. In a matrix-making machine, the combination of an impression-plunger, means for operating the same, a carriage for the matrix material supported by said plunger, and mechanism supported by said plunger for moving said carriage transversely of the line of movement of the plunger.

16. In a matrix-making machine, the combination of an impression-plunger, means for operating the same, an alining-plunger carried by said impression-plunger, a carriage for the matrix material mounted in bearings on the alining-plunger, and working in hole or recess in the impression-plunger, and mechanism for feeding the carriage transversely of the line of movement of the plunger.

In testimony that we claim the foregoing as our own we hereby affix our signatures in presence of two witnesses.

ERLE V. BEALS.
WM. B. NORTON.

Witnesses:
C. H. NORTON,
CHARLES F. BURTON.